G. B. DUSINBERRE.
BLOWER FOR SOUND PRODUCING DEVICES.
APPLICATION FILED MAR. 22, 1912.
1,120,377.
Patented Dec. 8, 1914.
2 SHEETS—SHEET 2.
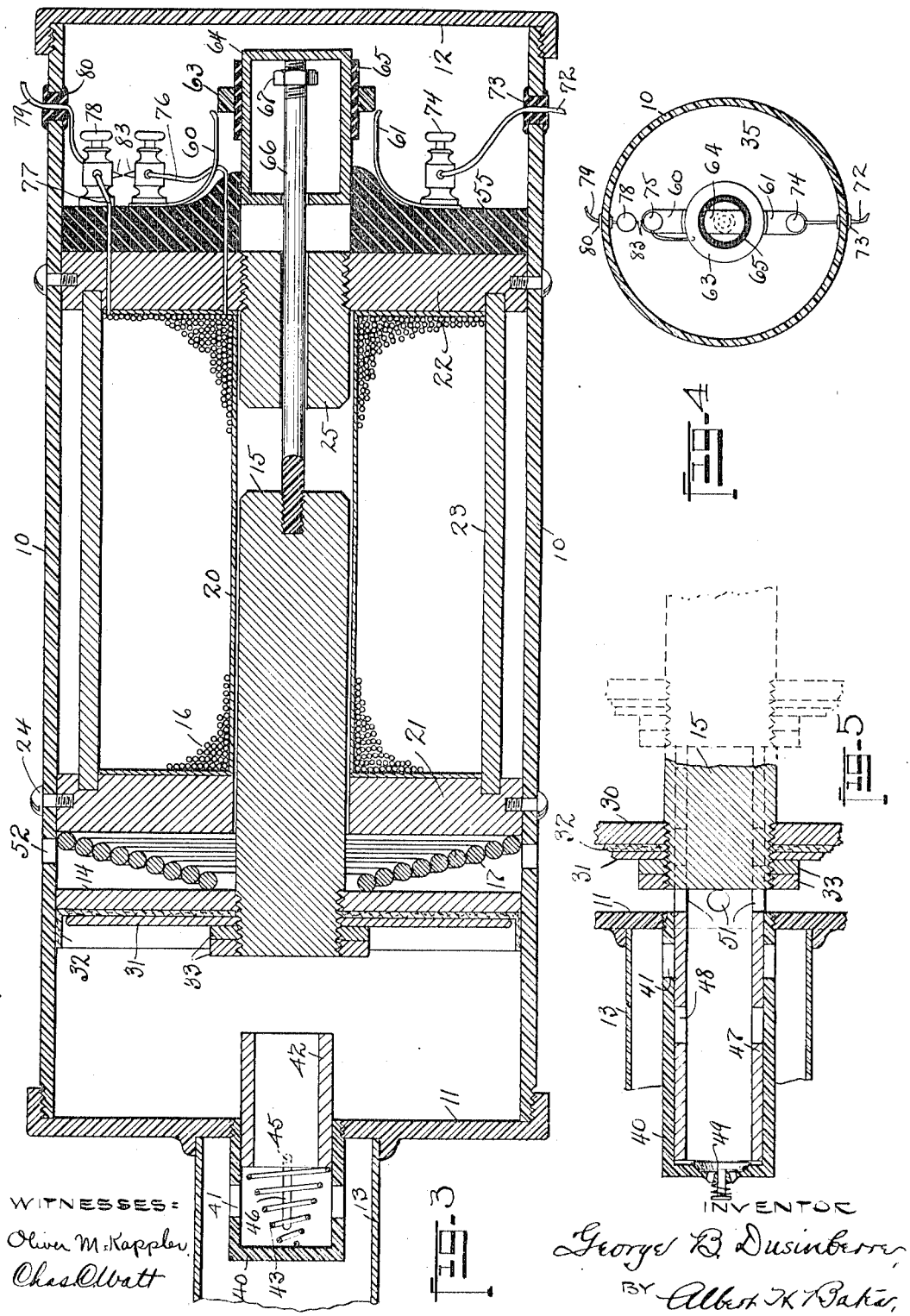
WITNESSES:
Oliver M. Kappler
Chas. Olbatt
INVENTOR
George B. Dusinberre
BY Albert K. Baker,
ATTORNEY

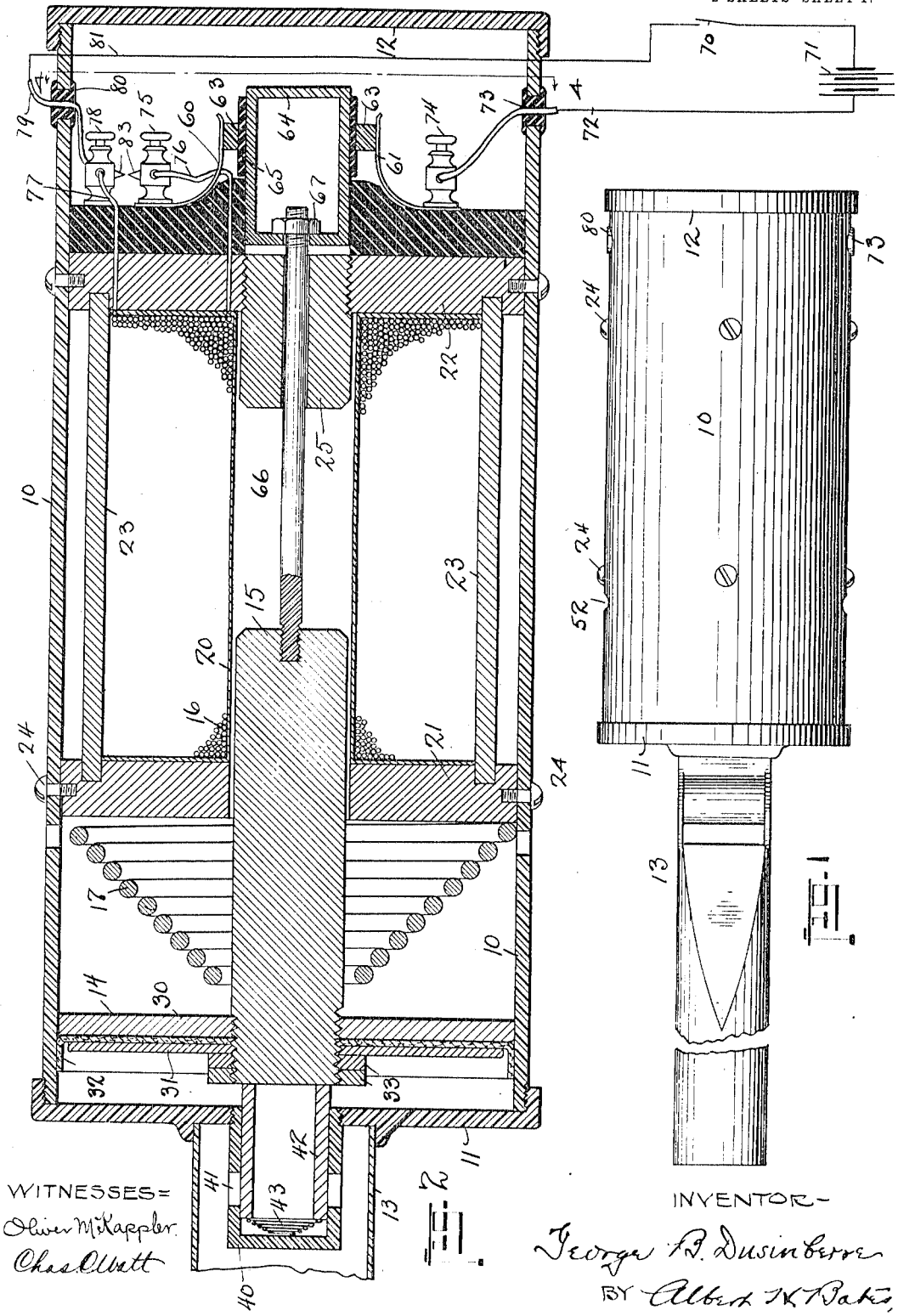

UNITED STATES PATENT OFFICE.

GEORGE B. DUSINBERRE, OF CLEVELAND, OHIO, ASSIGNOR TO R. S. MUELLER & COMPANY, OF CLEVELAND, OHIO, A COPARTNERSHIP, COMPOSED OF R. S. MUELLER AND GEORGE B. DUSINBERRE.

BLOWER FOR SOUND-PRODUCING DEVICES.

1,120,377.      Specification of Letters Patent.      Patented Dec. 8, 1914.

Application filed March 22, 1912. Serial No. 685,622.

*To all whom it may concern:*

Be it known that I, GEORGE B. DUSINBERRE, a citizen of the United States, residing at Cleveland, in the county of Cuyahoga and State of Ohio, have invented a certain new and useful Improvement in Blowers for Sound-Producing Devices, of which the following is a full, clear, and exact description, reference being had to the accompanying drawings:

The object of this invention is to provide an effective electrically operated sounding device adapted to give a warning signal.

My sound producing device is especially well adapted for automobile use. It operates to force successive blasts of air through a suitable horn or whistle, thereby producing a very effective warning signal.

More particularly, the invention consists of a cylinder and piston, a solenoid adapted to operate the piston in one direction and a spring to return it, a horn or whistle operated by the air so compressed, and an automatically-operated circuit maker and breaker to enable continuous operation of the device when the circuit at the controlling point is closed.

The particular embodiment of the invention shown in the drawings hereof and hereinafter described is also included within my invention.

In the drawings, Figure 1 is a side elevation of my sound producing device, an intermediate portion of the horn being broken out; Fig. 2 is an enlarged central longitudinal section through the air compressing device, showing the plunger in the position of rest; Fig. 3 is a similar view showing the plunger in the position it assumes when the solenoid is energized; Fig. 4 is a cross section on a reduced scale, as indicated by the line 4—4 of Fig. 2; Fig. 5 is a central section of a modified form of valve for controlling the admission to the horn.

As shown in the drawings, 10 represents a suitable cylinder of brass or other material, and 11 and 12 caps of suitable material screwing onto the ends thereof. Suitably connected with the cap 11 is the whistle or horn 13 adapted to receive air from the cylinder. Within the cylinder is a sliding piston 14 secured upon the forward end of the solenoid core 15 of soft iron. This core extends into a solenoid 16. Between the solenoid and piston is a spring 17 adapted to be compressed by the piston when the core moves into the solenoid. When the solenoid is energized the core is drawn inwardly and the piston spring assumes the position shown in Fig. 3. When the solenoid is deënergized, the spring reacting, forces the piston into substantially the position shown in Fig. 2 and thereby compresses the air in front of the piston, which air is forced through an opening in the head into the horn to blow it.

The construction of the parts referred to will now be more particularly described.

The solenoid winding 16 is lined by a suitable shell 20 of fiber, paper or corresponding material and is mounted between the two soft iron disks 21, 22 and within the soft iron sleeve 23. The disks 21 and 22 are secured to the shell 10 by screws 24, or otherwise, as desired. The soft iron sleeve is shown as seating in annular grooves in the faces of the disks. Screwing into the central portion of the disk 22 is a soft iron plug 25. This construction makes an iron clad solenoid which is adapted to have a powerful action on the movable iron core 15.

The piston 14 is preferably composed of two disks 30 and 31 secured on the forward end of the core 15, and the leather disk 32 held between them and flanged at its edge against the wall of the cylinder. A pair of nuts 33 screwing onto the end of the core, hold these disks together. The spring 17 referred to is preferably wound into a conical helix, as shown, and has its largest turn resting against the disk 21 and lying against the cylinder wall. The smallest turn comes close enough to the core 15 so that the spring is not materially displaced in operation.

To control the exit of the air compressed in front of the piston into the horn, I provide a thimble 40 screwed into the cap 11 and extending into the horn and having a closed outer end and exit openings 41 through its side wall: and slidable within this thimble is a sleeve 42 which constitutes a valve. In the form shown in Figs. 2 and 3 this sleeve is free from the core 15 and is given a tendency to move in that direction by a spring 43 compressed between the outer end of the sleeve and the head of the thimble. In the position shown in Fig. 2, the sleeve 42 closes the ports 41 and prevents the exit of air from the blower into the horn. As the piston is drawn in by the core, the sleeve 42 follows it under the action of the spring 43 sufficiently to uncover the ports 41, as shown in Fig. 3. A suitable stop is provided, preventing the sleeve being forced entirely out of the thimble, that shown being a pin 45, Fig. 3 carried by the sleeve operating in a slot 46 in the thimble. From the construction described, it will be seen that when the piston, drawn backwardly in the position shown in Fig. 3, is returned to the left by the spring 17, it compresses the air in front of the piston and forces the air through the sleeve 42 and out through the ports 41 until the engagement of the core with the sleeve 42 moves the latter into position to shut off the ports 41.

In the modification shown in Fig. 5 the valve sleeve 47 is secured to the core 15 and the passageway to the ports 41 is through openings 48 in the wall of the sleeve. With this construction it will be seen that as soon as the core is drawn into the solenoid the sleeve 47 beyond the ports 41 shuts off those ports (the check valve 49 then relieving the suction) and when the spring returns the piston, the air is compressed in the end of the cylinder until the piston almost reaches its extreme position, when the air is suddenly released into the horn, passing through the openings 51 into the sleeve and from thence out through the ports 48, 41 into the horn.

I desire to call particular attention to the fact that in my device the electro-magnetic force, which returns the piston, increases with the retraction, and that the counteracting force of the spring also increases with its compression caused by such retraction. The result is that this increased electro-magnetic energy of the solenoid is stored in potential energy of the spring, so that, on the return of the compressing stroke of the piston, a large force is immediately available for overcoming the inertia of rest of the piston and accelerating it to quickly bring the air in advance of the piston up to the necessary point of compression to blow the horn. The conico-helical form of the spring should be noted, as by this means I obtain a spring which presents a light resistance at the start and a constantly augmented resistance as it is compressed. Thus I make the increase in the counteracting force of the spring more or less nearly the equivalent of the increase in the retracting force of the solenoid with the desired result stated.

It will be seen from Fig. 2 that, in that embodiment, the port 41 is closed before the piston reaches the extreme forward stroke, and this enables the air in front of the piston to check the movement of the piston, the parts thus constituting an effective dash pot to cushion the end of the stroke. On the backward stroke the air behind the piston passes outwardly through the opening 52 in the cylinder. The core fits loosely enough into the shell 20 so that the air need not retard its inward movement. At the same time, if desired, a certain amount of dash pot action may be obtained on that end of the stroke.

To cause the piston to reciprocate continuously whenever desired, I provide a circuit maker and breaker operated by the core 15, which I will now describe.

Secured within the casing 10 beyond the disk 22 is an insulating disk 55 which carries a pair of electric terminals 60 and 61. These terminals may be disconnected from each other, as shown in Fig. 3, or electrically connected, by a brass or metal ring 63. This ring is mounted on a movable yoke 64 and insulated from it by a sleeve 65. The yoke loosely surrounds a rod 66 which passes loosely through the plug 25 but screws into the end of the core 15. On the rod 66 is a nut 67. When the parts are in their idle position, as shown in Fig. 2, the nut 67 has drawn the yoke toward the left into the opening in the insulating disk 55, and this causes the ring 63 to contact with the terminal springs 60 and 61. The spring 61 is one terminal of the outside controlling circuit, the other end of which, after passing through the solenoid, terminates in the spring 60. Accordingly, in the position of the parts shown in Fig. 2, the circuit is closed through the solenoid and this draws in the core until the end of the rod 66 abutting the head of the yoke 64 forces it into the position shown in Fig. 3, which disconnects the terminals 60 and 61. This deenergizes the solenoid and the spring forces back the core and the piston to normal position, and as they come into this position the nut 67 engaging the yoke draws it to the left and reëstablishes the connection. Accordingly, whenever the outside circuit is closed through the source of current, the core and plunger reciprocate, sending successive blasts of air through the horn.

The electric circuit for operating the device is illustrated diagrammatically in Fig. 2. 70 is a suitable push button or switch for closing the circuit, and 71 a battery or other source of power. From the battery the line 72 leads through an insulating sleeve 73, preferably to a binding post 74 connected with the terminal 61. The terminal 60 is shown as connected with the binding post 75, from which is connected one end 76 of the solenoid winding. The other end 77 of that winding is shown as connected with a binding post 78, from which a conductor 79 leads outwardly through the insulating sleeve 80 to the wire 81, returning to the switch 70. I have shown adjacent points 83 on the two binding posts 75 and 78 to form a protection for the solenoid against discharge, as the same would arc from one point 83 to the other and thus save the solenoid.

My device, it will be seen, is simple in construction and may be very neat in appearance. It is very effective in giving a succession of warning blasts and is operated with the maximum of ease, it being only necessary to close the switch or press a button and the succession of blasts continues as long as the circuit is closed. Practice has demonstrated that such succession of blasts is a much more effective warning than a single blast.

Having thus described my invention, what I claim is:

1. The combination of a cylinder, a solenoid therein, a piston in the cylinder, a movable core for the solenoid connected with the piston, a spring between the piston and solenoid, a thimble having a port, and a slidable sleeve within the thimble adapted to control such port, said sleeve being movable by the core and piston.

2. The combination of a cylinder, a piston therein, electro-magnetic means for moving the piston in one direction, a spring for moving it in the opposite direction, and a valve in the end wall of the cylinder adapted to be moved by contact with the piston for controlling the passage of air from in front of the piston.

3. The combination, with a cylinder, of a solenoid therein, a movable core for the solenoid, a piston operated by the same and secured to it, a spring surrounding the core between the piston and solenoid and tending to force the piston away from the solenoid, and a sleeve valve in the end wall of the cylinder actuated by the movement of the piston for controlling the exit of air.

4. The combination, with a cylinder and piston, of a solenoid, a core for the solenoid adapted to move the piston in one direction, a helical spring acting on the piston presenting a continuously increasing resistance to the increasing pull of the solenoid, whereby the spring in reacting exerts its maximum force at the start, and a valve operated by the expanding spring for releasing fluid which the spring has compressed.

5. The combination, with a cylinder, of a solenoid therein, a piston in the cylinder, a movable core for the solenoid connected with the piston, a conical helical spring interposed between the piston and the solenoid, and a sleeve valve movable in the end wall of the cylinder adapted to be moved by the piston.

6. The combination, with a cylinder and a piston, of a solenoid for retracting the piston, a spring for moving the piston in the direction to compress air, a sleeve valve in the end wall of the cylinder adapted to be normally open during a major portion of the movement of the piston and adapted to be closed by the movement of the piston near the end of the compression stroke, thereby providing an air cushion to check the movement of the piston.

7. The combination, with a cylinder and piston, of a solenoid for retracting the piston with an increasing force, a conical helical spring for resisting such retraction with an increasing force and reacting on the piston with a diminishing force during the compressing action, and a valve operated by the expanding spring for releasing fluid which the spring has compressed.

8. The combination, with a cylinder and piston, of a valve for controlling discharge from the cylinder, a solenoid for retracting the piston, a spring for moving the piston in the direction to compress air, and means for automatically operating the valve to shut off the communication from the cylinder near the forward end of the stroke of the piston to provide an air cushion checking the movement of the piston.

In testimony whereof, I hereunto affix my signature in the presence of two witnesses.

GEORGE B. DUSINBERRE.

Witnesses:
 ALBERT H. BATES,
 J. B. HULL.